United States Patent

(12) United States Patent
Neumann et al.

(10) Patent No.: US 12,096,257 B2
(45) Date of Patent: Sep. 17, 2024

(54) CHANNEL STATE INFORMATION (CSI) REPORTING INCLUDING A STALE CSI REPORT

(71) Applicant: Apple Inc., Cupertino, CA (US)

(72) Inventors: David Neumann, Munich (DE); Dawei Zhang, Saratoga, CA (US); Ghaith N. Hattab, Santa Clara, CA (US); Haitong Sun, Cupertino, CA (US); Ismael Gutierrez Gonzalez, San Jose, CA (US); Wei Zeng, Saratotga, CA (US); Yeong-Sun Hwang, Germering (DE); Yushu Zhang, Beijing (CN); Ziyang Ju, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,639

(22) PCT Filed: Aug. 5, 2020

(86) PCT No.: PCT/CN2020/107154
§ 371 (c)(1),
(2) Date: Sep. 21, 2021

(87) PCT Pub. No.: WO2022/027332
PCT Pub. Date: Feb. 10, 2022

(65) Prior Publication Data
US 2023/0300641 A1    Sep. 21, 2023

(51) Int. Cl.
*H04W 24/08* (2009.01)
*H04L 1/00* (2006.01)
*H04W 72/232* (2023.01)

(52) U.S. Cl.
CPC ........... *H04W 24/08* (2013.01); *H04L 1/0026* (2013.01); *H04W 72/232* (2023.01)

(58) Field of Classification Search
CPC .... H04W 24/08; H04W 72/232; H04L 1/0026
See application file for complete search history.

(56) References Cited

U.S. PATENT DOCUMENTS

2016/0081023 A1    3/2016 Ji et al.
2016/0212649 A1    7/2016 Chen et al.
(Continued)

FOREIGN PATENT DOCUMENTS

CN    106233772 A    12/2016
CN    108781450 A    11/2018
(Continued)

OTHER PUBLICATIONS

3GPP TS 38.214 version 16.2.0 Release 16, 5G; NR; Physical layer procedures for data (Year: 2020).*
(Continued)

*Primary Examiner* — Siming Liu
(74) *Attorney, Agent, or Firm* — Sterne, Kessler, Goldstein & Fox P.L.L.C.

(57) ABSTRACT

Some aspects of this disclosure relate to apparatuses and methods for implementing channel state information (CSI) reporting that includes a stale CSI report. Based at least in part on a CSI reporting configuration, a user equipment (UE) performs CSI measurements during a current reference time period, and generates one or more CSI reports including at least a stale CSI report. A stale CSI report is generated based at least in part on CSI measurements performed prior to the current reference time period. The UE further generates an uplink message including the one or more CSI reports, and transmits the uplink message to the base station under a reporting setting determined by the CSI reporting configuration.

19 Claims, 7 Drawing Sheets

(56) References Cited

U.S. PATENT DOCUMENTS

| | | | |
|---|---|---|---|
| 2017/0041059 A1 | 2/2017 | Yi et al. | |
| 2019/0036579 A1 | 1/2019 | Wei et al. | |
| 2019/0159219 A1 | 5/2019 | Hosseini et al. | |
| 2019/0166618 A1 | 5/2019 | Hugl et al. | |
| 2020/0059282 A1 | 2/2020 | Wu et al. | |
| 2020/0177254 A1 | 6/2020 | Lee et al. | |
| 2021/0028844 A1* | 1/2021 | Song | H04L 5/0057 |
| 2021/0326108 A1* | 10/2021 | Lewis | G06F 9/526 |

FOREIGN PATENT DOCUMENTS

| | | | |
|---|---|---|---|
| CN | 109417457 A | 3/2019 | |
| CN | 111373674 A | 7/2020 | |
| JP | 2010113505 A | 5/2010 | |
| WO | WO-2018231812 A1 * | 12/2018 | H04B 7/0626 |

OTHER PUBLICATIONS

International Search Report and Written Opinion of the International Searching Authority directed to related International Patent Application No. PCT/CN2020/107154, mailed Apr. 27, 2021; 9 pages.

Extended European Search Report directed to related European Application No. 20948487.2, mailed Aug. 28, 2023; 13 pages.

Ericsson, "Remaining issues on CSI reporting," 3GPP TSG RAN WG 1, R1-1804973, Apr. 7, 2018; 9 pages.

3GPP TS 38.212 V16.2.0, 3rd Generation Partnership Project; Technical Specification Group Radio Access Network; NR; Multiplexing and channel coding (Release 16), Jun. 2020; 151 pages.

Japanese Final Notice of Rejection directed to Japanese Patent Application No. 2023-507756, mailed Jul. 23, 2024, with attached English-language translation; 9 pages.

* cited by examiner

| | 317 | 319 |
|---|---|---|
| 318 → | CSi report #1 Part 1 | Stale or Current |
| | ⋮ | ⋮ |
| | CSi report #n Part 1 | Stale or Current |
| | CSi report #1 Part 2 Group 0 | Stale or Current |
| | ⋮ | ⋮ |
| | CSi report #n Part 2 Group 0 | Stale or Current |
| | CSi report #1 Part 2 Group 1 and 2 | Stale or Current |
| | ⋮ | ⋮ |
| | CSi report #n Part 2 Group 1 and 2 | Stale or Current |

FIG. 3

CHANNEL STATE INFORMATION (CSI) REPORTING INCLUDING A STALE CSI REPORT

This application is a U.S. National Phase of International Application No. PCT/CN2020/107154, filed Aug. 5, 2020, which is hereby incorporated by reference in its entirety.

BACKGROUND

Field

The described aspects generally relate to reporting channel information in wireless communications.

Related Art

A user equipment (UE) communicating with a base station (for example, an evolved Node B (eNB), a next generation node B (gNB), or other base station) over a communication link can measure channel properties of the communication link. For example, the UE can measure how a signal propagates on a downlink channel from the base station to the UE. The UE can generate a channel state information (CSI) report based on the measured channel properties. The UE can transmit the CSI report in an uplink message to the base station. The base station can use the received CSI report included in the uplink message to adapt its transmission to the UE based on the channel properties reported by the UE.

SUMMARY

Some aspects of this disclosure relate to apparatuses and methods for implementing channel state information (CSI) reporting that includes a stale CSI report for wireless communication systems, e.g., a wireless communication system based on 3rd Generation Partnership Project (3GPP) release 16 (Rel-16), release 17 (Rel-17), or beyond. For example, systems and methods are provided implementing designs for reporting New Radio (NR) Multiple-input/multiple-output (MIMO) CSI reports, or NR further enhanced MIMO (FeMIMO) CSI reports.

Some aspects of this disclosure relate to a user equipment (UE). The UE includes a transceiver configured to communicate over a wireless network with a base station and a processor communicatively coupled to the transceiver. The processor receives, using the transceiver and from the base station, a downlink message including a CSI reporting configuration. Based at least in part on the CSI reporting configuration, the processor performs CSI measurements during a current reference time period. The processor further generates one or more CSI reports, where the one or more CSI reports include at least a stale CSI report. A stale CSI report is generated based at least in part on CSI measurements performed prior to the current reference time period. In some examples, the one or more CSI reports further include a current CSI report generated based at least in part on the CSI measurements performed during the current reference time period. Afterwards, the processor generates an uplink message including the one or more CSI reports. Using the transceiver, under a reporting setting determined by the CSI reporting configuration, the processor further transmits the uplink message to the base station. The reporting setting may include an aperiodic setting, a periodic setting, or a semi-persistent setting.

In some examples, the CSI measurements performed during the current reference time period include a measurement for a parameter selected from a CSI reference signal (CSI-RS) resource indicator (CRI), a synchronization signal/physical broadcast channel (PBCH) block resource indicator (SSBRI), a layer 1 reference signal received power (L1-RSRP), a rank indicator (RI), a precoding matrix indicator (PMI), a layer indicator (LI), a channel quality indicator (CQI), or a signal to interference plus noise ratio (SINR). Furthermore, the CSI measurements performed during the current reference time period include a measurement collected for each signal path of multiple signal paths between multiple antenna ports at the base station and the UE.

In some examples, a CSI report may include multiple parts, where a part of the CSI report may include multiple groups. For example, a CSI report may include a first part and a second part, where the second part may further include group 0, group 1, and group 2. Accordingly, the stale CSI report may include a first part generated based at least in part on the CSI measurements performed during the current reference time period, and a second part generated based at least in part on CSI measurements performed prior to the current reference time period. In some examples, the stale CSI report may include some group of the second part generated based at least in part on CSI measurements performed prior to the current reference time period, while some other groups of the second part are generated based at least in part on the CSI measurements performed during the current reference time period.

In some examples, the uplink message may include a first part of the stale CSI report that is generated based at least in part on the CSI measurements performed during the current reference time period, and a second part of the stale CSI report that is generated based at least in part on the CSI measurements performed prior to the current reference time period. Additionally and alternatively, the uplink message may include the first part of the stale CSI report that is generated based at least in part on the CSI measurements performed prior to the current reference time period, while the second part of the stale CSI report is not included in the uplink message.

In some examples, the uplink message may further include an indicator to indicate that the stale CSI report has a stale status. When the one or more CSI reports include a current CSI report and a stale CSI report, the uplink message further includes a first indicator to indicate that the stale CSI report has a stale status, and a second indicator to indicate that the current CSI report has a current status. In some examples, the uplink message may include a CSI reporting table including the stale CSI report, the first indicator, the current CSI report, and the second indicator.

In some examples, to complete CSI reporting to the base station, the uplink message may be carried by a physical uplink control channel (PUCCH) or a physical uplink shared channel (PUSCH). In some examples, the reporting setting includes a semi-persistent setting or an aperiodic setting, which is activated by a downlink control information (DCI). Furthermore, the DCI activates a semi-persistent CSI reference signal to perform the CSI measurements in semi-persistent or aperiodic manner. In some examples, the semi-persistent CSI reference signal is activated after a predetermined time period from when the DCI is received.

In some examples, multiple CSI reports included in the uplink message have a relative priority, and the stale CSI report has a least priority of the multiple CSI reports included in the uplink message. In some examples, multiple CSI reports have a relative priority according to a priority sequence below: a CSI report including layer 1 reference signal received power (L1-RSRP) or a signal to interference plus noise ratio (SINR)>a CSI report including other reportQuantity, where reportQuantity is configured in RRC as a part of CSI report configuration; and an aperiodic (AP) CSI report>a semi-persistent (SP) CSI report carried by physical uplink shared channel (PUSCH)>a semi-persistent (SP) CSI report carried by physical uplink control channel (PUCCH)>a periodic CSI report carried by PUCCH, where a symbol ">" means "having higher priority."

Some aspects of this disclosure relate to a method. The method includes receiving, by a UE and from a base station, a downlink message including a CSI reporting configuration, and generating a plurality of CSI reports. The plurality of CSI reports include at least a stale CSI report based at least in part on CSI measurements performed prior to a current reference time period, and a current CSI report based at least in part on CSI measurements performed during the current reference time period and based at least in part on the CSI reporting configuration. Afterwards, the method includes generating an uplink message including the plurality of CSI reports, and transmitting the uplink message to the base station under a reporting setting determined by the CSI reporting configuration.

Some aspects of this disclosure relate to a non-transitory computer-readable medium storing instructions. When the instructions are executed by a processor of a UE, the instructions cause the processor to perform operations including receiving from a base station, a downlink message including a CSI reporting configuration. The operations further include performing, based at least in part on the CSI reporting configuration, CSI measurements during a current reference time period. In addition, the operations include generating a plurality of CSI reports. The plurality of CSI reports include at least a stale CSI report based at least in part on CSI measurements performed prior to the current reference time period, and a current CSI report based at least in part on the CSI measurements performed during the current reference time period. The operations further include generating an uplink message including the plurality of CSI reports, and transmitting, under a reporting setting determined by the CSI reporting configuration, the uplink message to the base station.

Some aspects of this disclosure relate to a base station. The base station includes a transceiver configured to communicate over a wireless network with a UE and a processor communicatively coupled to the transceiver. The processor transmits, using the transceiver and to the UE, a downlink message including a CSI reporting configuration. Furthermore, the processor receives, using the transceiver and from the UE, an uplink message including a plurality of CSI reports. The plurality of CSI reports include at least a stale CSI report based at least in part on CSI measurements performed prior to a current reference time period, and a current CSI report based at least in part on CSI measurements performed during the current reference time period based at least in part on the CSI reporting configuration.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 3 illustrates an example CSI reporting table used in CSI reporting including a stale CSI report, according to some aspects of the disclosure.

Figure 1:
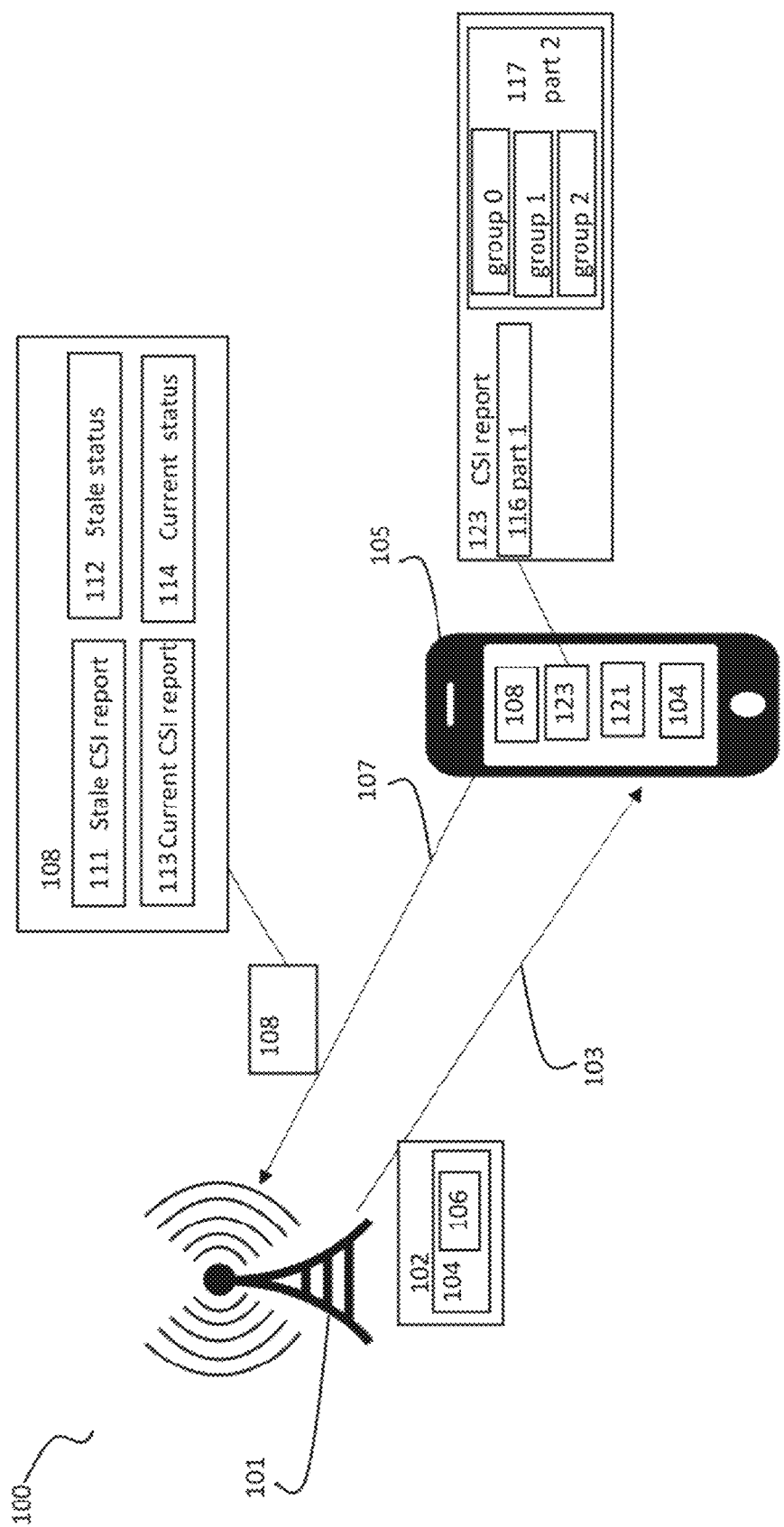
FIG. 1 illustrates an example wireless system implementing designs for channel state information (CSI) reporting that includes a stale CSI report, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless system, channel status information (CSI) is a mechanism that a user equipment (UE) measures various radio channel quality and reports the result to the network or a base station (for example, an evolved Node B (eNB), a next generation node B (gNB), or other base station). The base station can use the received CSI report included in an uplink message to adapt its transmission to the UE based on the channel properties reported by the UE. In some examples, using a CSI reporting configuration, a base station controls the time and frequency resources that can be used by a UE to report CSI to the base station. Based on the CSI reporting configuration, the UE measures channel and interference over configured resources, generates intended CSI reports, and sends the CSI reports over the configured uplink channels at the right time (by configuration and/or by triggering). In general, a CSI reporting configuration for CSI acquisition and reporting may include mainly three aspects: resource setting, reporting setting, and list of report triggers. The reporting setting for CSI can be aperiodic, periodic, or semi-persistent.

CSI reporting may run into various difficulties for current or future high performance wireless systems. The performance for current or future wireless communication systems may be more demanding than for previous generations of mobile networks, supporting high data rates, e.g., 20 Gbps, very low latency, e.g., <1 mSec, ultra-high reliability, energy efficiency, and very high numbers of connected devices. For such wireless communication systems, a UE may not be able to process all the CSI reporting configured by a base station due to various reasons. For example, there may be a misalignment in terms of CSI processing unit (CPU) rule between the network (NW) and the UE. There may be a large number of CSI resources/ports configured exceeding the UE processing capability. There may be a temporary reduction of UE capability due to various reason such as thermal, other carrier processing etc., or other difficulties and inefficiency.

Current solutions to CSI reporting difficulties may be insufficient or inefficient. When a UE cannot perform CSI reporting as configured by a base station, conventionally, some CSI reports configured to be provided by the UE are omitted. For example, a CSI report is omitted when the size of the reported CSI is smaller than the size of the scheduled uplink control information (UCI). However, omitting CSI reports configured to be provided may leave the base station without the needed information, resulting in deteriorated communication between the UE and the base station. In addition, current CSI reporting configurations determined by a base station may be inefficient. For example, a semi-persistent CSI (SP-CSI) reporting may be activated by a downlink control information (DCI). However, SP-CSI reference signal (SP-CSI RS), which is needed for SP-CSI reporting, may need to be activated by another control signal, e.g., Medium Access Control (MAC) control element (MAC-CE). The use of the additional control signal for SP-CSI RS causes unnecessary overhead and increased latency.

Some aspects of this disclosure provide improved solutions to CSI reporting difficulties encountered in current or future wireless systems. In detail, apparatuses and methods are presented for implementing CSI reporting that includes a stale CSI report for wireless communication systems. Herein, a stale CSI report is based at least in part on CSI measurements performed prior to a current reference time period, whereas a current CSI report is based on measurements in the current reference time period. Instead of omitting, a stale CSI report can still provide certain useful information for the base station to adapt its transmission to the UE. Sending a stale CSI report may not increase much the computation requirements of the CPU, hence satisfying the computation constraints of the CPU of the UE, while providing certain guidance for the base station. When a UE is not in a fast moving environment, a stale CSI report may be substantially the same as a current CSI report.

According to some aspects, a UE disclosed herein may operate in a wireless communication system based on 3rd Generation Partnership Project (3GPP) release 16 (Rel-16), release 17 (Rel-17), or a New Radio (NR) Multiple-input/multiple-output (MIMO) system having MIMO CSI reports, or NR further enhanced MIMO (FeMIMO) CSI reports. MIMO is a core technique for such a wireless system which lead to multiple signal paths between a base station and a UE, each with different propagation characteristics. Accordingly, a CSI measurement is collected for each potential signal path, and further fed back by the UE for the base station to determine the optimum or desired signal path for the UE.

According to some aspects, the time and frequency resources to be used by a UE for CSI reporting may be indicated by a CSI reporting configuration included in a downlink message from the base station to the UE. According to some example, the resources for the CSI reporting, the CSI reporting configuration, and other settings can be set by the base station during a Radio Resource Control (RRC) connection setup process, or by activated by a downlink control information (DCI).

Although some examples of the contents of the CSI report configurations or CSI reports are provided above, the aspects of this disclosure are not limited to these examples and the CSI report configuration message can include less, more, or other parameters, instructions, and/or information.

Figure 2:
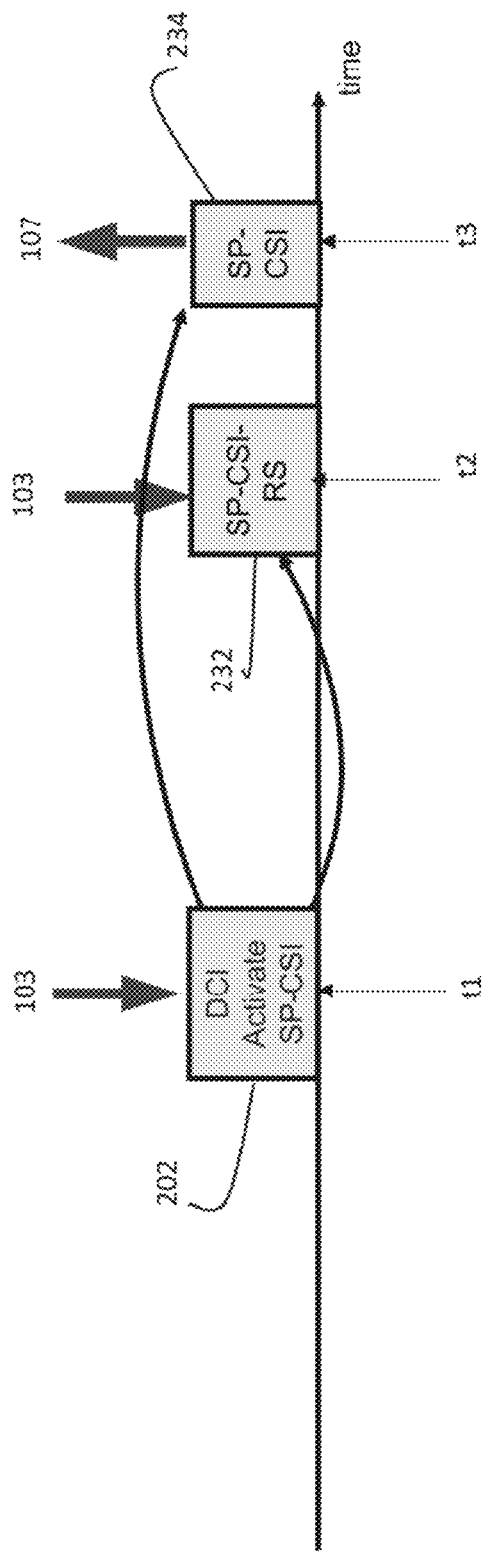
FIG. 2 illustrates an example for triggering a semi-persistent CSI reference signal used for CSI reporting, according to some aspects of the disclosure.

FIG. 1 illustrates an example wireless system 100 implementing designs for channel state information (CSI) reporting that includes a stale CSI report, according to some aspects of the disclosure. FIG. 2 illustrates an example for triggering a semi-persistent CSI reference signal used for CSI reporting, according to some aspects of the disclosure. FIG. 3 illustrates an example CSI reporting table used in CSI reporting including a stale CSI report, according to some aspects of the disclosure. The wireless system 100 is provided for the purpose of illustration only and does not limit the disclosed aspects. The system 100 may include, but is not limited to, a network node (herein referred to as base station) 101 and an electronic device (hereinafter referred to as UE) 105.

According to some aspects, the base station 101 can include a node configured to operate based on a wide variety of wireless communication techniques such as, but not limited to, techniques based on 3GPP standards. For example, base station 101 can include a node configured to operate using Rel-16, Rel-17, or later. The base station 101 can be a fixed station, and may also be called a base transceiver system (BTS), an access point (AP), a transmission/reception point (TRP), an evolved NodeB (eNB), a next generation node B (gNB), or some other equivalent terminology.

According to some aspects, the UE 105 can include an electronic device configured to operate based on a wide variety of wireless communication techniques. These techniques can include, but are not limited to, techniques based on 3rd Generation Partnership Project (3GPP) standards. For example, referring to FIG. 1, the UE 105 can include an electronic device configured to operate using Rel-16, Rel-17 or later. The UE 105 can include, but is not limited to, a wireless communication device, a smart phone, a laptop, a desktop, a tablet, a personal assistant, a monitor, a television, a wearable device, an Internet of Things (IoTs), a vehicle's communication device, a mobile station, a subscriber station, a remote terminal, a wireless terminal, a user device, or the like.

According to some aspects, the base station 101 may use a CSI reporting configuration to control the time and frequency resources that can be used by the UE 105 to report CSI to the base station 101. Based on the CSI reporting configuration, the UE 105 measures channel and interference over configured resources, generates intended CSI reports, and sends the CSI reports over the configured uplink channels at the right time (as specified by configuration and/or by triggering). The base station 101 can use the received CSI report included in an uplink message to adapt its transmission to the UE 105 based on the channel properties reported by the UE 105.

Figure 6:
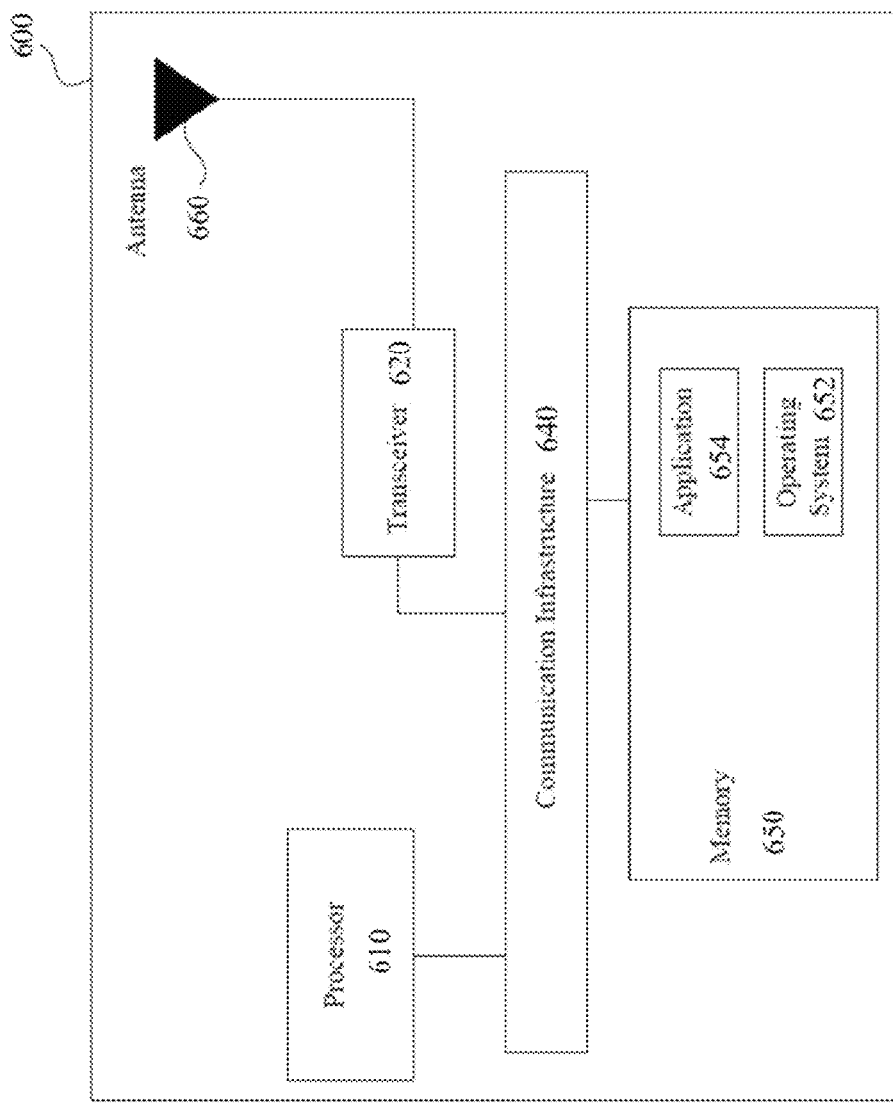
FIG. 6 illustrates a block diagram of an example system of an electronic device implementing designs for CSI reporting that includes a stale CSI report, according to some aspects of the disclosure.
Figure 7:
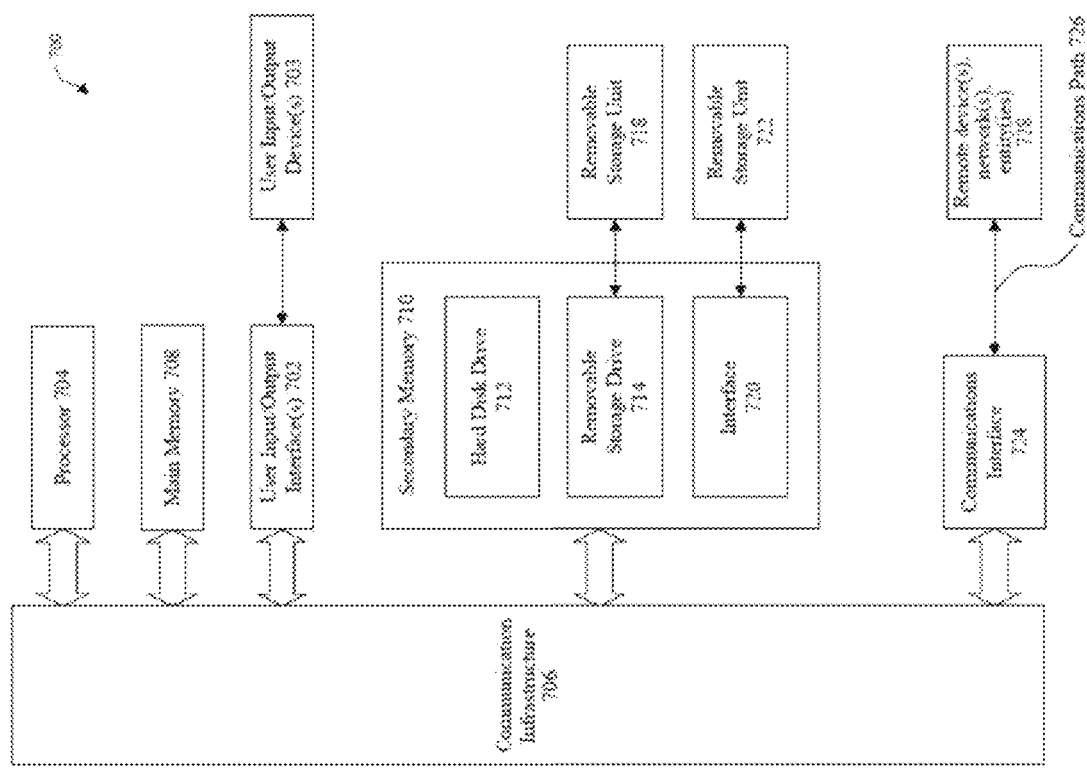
FIG. 7 is an example computer system for implementing some aspects or portion(s) thereof of the disclosure provided herein.

In some examples, the UE 105 may include a transceiver configured to wirelessly communicate with the base station 101, and a processor communicatively coupled to the transceiver, as shown in more details in FIGS. 6 and 7. The UE 105 can be connected to and can communicate with the base station 101 using one or more communication links, e.g., a downlink 103 and an uplink 107. In a MIMO wireless system, there may be multiple signal paths between multiple antenna ports at the base station 101 and the UE 105, while the downlink 103 and the uplink 107 may be an example of any such signal path between an antenna port at the base station 101 and the UE 105. There are other multiple signal paths between an antenna port at the base station 101 and the UE 105, not shown.

In some examples, using the transceiver, the UE 105 receives from the base station 101 a downlink message 102 including a CSI reporting configuration 104. The CSI reporting configuration 104 may include information about resource setting, reporting setting, and list of report triggers for CSI reporting by the UE 105. In detail, the CSI reporting configuration 104 includes a reporting setting 106, which may include an aperiodic (AP) setting, a periodic setting, or a semi-persistent (SP) setting. In some examples, the downlink message 102 may be a RRC message or signaling, or a DCI.

In some examples, when the reporting setting 106 includes a semi-persistent setting or an aperiodic setting, the downlink message 102 may be a DCI to activate the semi-persistent setting or an aperiodic setting. As shown in FIG. 2, at a time instance t1, a DCI 202 may be received through a downlink, e.g., the downlink 103, to activate a semi-persistent CSI (SP-CSI) reporting for the UE 105. At a time instance t2, a semi-persistent CSI reference signal (SP-CSI RS) 232 may be activated, e.g., received through the downlink 103, to enable the UE 105 to perform the CSI measurements in semi-persistent manner. Furthermore, at a time instance t3, a CSI report may be transmitted through the uplink 107 in a semi-persistent manner to the base station 101. The time difference between the time instance t1 and the time instance t2 may be a predetermined time period from when the DCI is received. Hence, the SP-CSI RS 232 is activated after a predetermined time period from time instance t1 when the DCI 202 is received.

In some examples, the activation time for the SP-CSI RS 232 may follow one of the following options. In one option, the SP-CSI RS 232 is activated immediately after the UE 105 sends back a HARQ-ACK message. In another option, the SP-CSI RS 232 is activated 3 milliseconds (ms) after the UE 105 sends back a HARQ-ACK message. In another option, the SP-CSI RS 232 is activated 3 ms+K ms after t1, where K may be determined by various factors. For example, K may be determined by the base station 101 and signaled to the UE 105. Additionally and alternatively, K can be based on the downlink Physical Downlink Shared Channel (PDSCH) processing capability of the UE 105, or the uplink PDSCH processing capability of the UE 105. In some examples, K can be hard coded in the UE 105 based on its various processing capabilities.

The DCI 202 to trigger the SP-CSI reporting is shown merely as an example. In some examples, the DCI 202 can trigger other CSI reporting, e.g., an AP-CSI reporting. If AP-CSI requires a SP-CSI RS, the UE 105 may activate the SP-CSI RS 232 at the time instance t2. The activation time for the SP-CSI RS for AP-CSI reporting may follow a similar option as the activation time for the SP-CSI RS for SP-CSI reporting outlined above. In one option, the SP-CSI RS 232 is activated immediately after the UE 105 sends back a HARQ-ACK message. In another option, the SP-CSI RS 232 is activated 3 milliseconds (ms) after the UE 105 sends back a HARQ-ACK message. In another option, the SP-CSI RS 232 is activated 3 ms+K ms after t1, where K may be determined by various factors. For example, K may be determined by the base station 101 and signaled to the UE 105. Additionally and alternatively, K can be based on the downlink PDSCH processing capability of the UE 105, or the uplink PDSCH processing capability of the UE 105. In some examples, K can be hard coded in the UE 105 based on its various processing capabilities.

In some examples, based on the received CSI reporting configuration 104, the UE 105 performs, CSI measurements during a current reference time period to obtain CSI measurements 121. Performing CSI measurements 121 can consume CSI processing unit (CPU) power, CSI resources, or ports of the UE 105. In addition, the UF 105 may also store CSI measurements performed prior to the current reference time period, not shown. The current reference time period may be defined by the downlink message 102, by the base station 101, or by the UE 105.

In some examples, the CSI measurements 121 may include a measurement for a parameter selected from a CSI reference signal (CSI-RS) resource indicator (CRI), a synchronization signal/physical broadcast channel (PBCH) block resource indicator (SSBRI), a layer 1 reference signal received power (L1-RSRP), a rank indicator (RI), a precoding matrix indicator (PMI), a layer indicator (LI), a channel quality indicator (CQI), or a signal to interference plus noise ratio (SINR). Furthermore, the CSI measurements performed during the current reference time period include a measurement collected for each signal path of multiple signal paths between multiple antenna ports at the base station and the UE.

In some examples, the UE 105 generates one or more CSI reports, e.g., a CSI report 123, based on various CSI measurements. In some examples, a CSI report, e.g., the CSI report 123, may include multiple parts, where a part of the CSI report may include multiple groups. For example, the CSI report 123 includes a first part 116 and a second part 117, where the second part 117 further includes group 0, group 1, and group 2. The first part 116 may be a Type I standard-resolution report, while the second part 117 may be a Type II high resolution report. In addition, the first part 116 and the second part 117 may be based on different measurements, different reference signal, or different codebooks.

In some examples, the CSI report 123 is a stale CSI report if it is generated based at least in part on CSI measurements performed prior to the current reference time period. On the other hand, the CSI report 123 is a current CSI report if it is generated based on the CSI measurements 121 performed during the current reference time period. Using a stale CSI report can save the CPU power, CSI resources, or ports of the UE 105 at the current reference time period, since the stale CSI report uses such CSI measurements performed prior to the current reference time period. In some examples, when the UE 105 is not in a fast moving environment, CSI measurements performed prior to the current reference time period may be similar or substantially the same as CSI measurements at the current reference time period. Therefore, the quality of the data in a stale CSI report may be similar or substantially the same as a current CSI report.

In some examples, a stale CSI report may include a first part generated based at least in part on the CSI measurements performed during the current reference time period, and a second part generated based at least in part on CSI measurements performed prior to the current reference time period. In some examples, the stale CSI report may include some group of the second part generated based at least in part on CSI measurements performed prior to the current reference time period, while some other groups of the second part are generated based at least in part on the CSI measurements performed during the current reference time period.

In some examples, the UE 105 generates an uplink message 108 including the one or more CSI reports, e.g., the CSI report 123, and transmit the uplink message 108 to the base station 101. The transmission of the uplink message 108 may be based on the reporting setting 106 determined by the CSI reporting configuration 104. The uplink message 108 may be carried by a physical uplink control channel (PUCCH) or a physical uplink shared channel (PUSCH).

In some examples, the uplink message 108 may further include an indicator to indicate that a CSI report has a stale status (e.g., referred to herein as a stale CSI report). When the uplink message 108 includes a current CSI report 113 and a stale CSI report 111, the uplink message 108 may further include an indicator 112 to indicate that the stale CSI report 111 has a stale status, and an indicator 114 to indicate that the current CSI report 113 has a current status.

In some examples, the uplink message 108 may include a CSI reporting table including a stale CSI report, a current CSI report, and various indicators to indicate the status of the CSI reports. As shown in FIG. 3, a table 318 may be included in the uplink message 108. The table 318 includes two columns, a column 317 for the multiple CSI reports, or its parts or groups, and a column 319 for the status of the CSI report, its parts or groups. In some examples, the column 319 may include one bit having a value 0 or 1 to indicate a corresponding CSI report is stale or current. The table 318 includes n CSI reports. Part 1 of each CSI report of the n CSI reports has an indicator of the status of part 1. Similarly, group 0 of Part 2 of each CSI report of the n CSI reports has an indicator of the status as well. In addition, group 1 and group 2 of Part 2 of each CSI report of the n CSI reports has an indicator of the status. FIG. 3 is merely an example to show the various CSI reports and their status of being stale or current. There may be other forms of tables to show CSI reports and their statuses. The following Table I and Table II further illustrate different CSI tables including CSI reports with their corresponding statuses.

TABLE I

| CSI report #1 | Stale/current |
| CSI report #2 | Stale/current |
| CSI report #3 | Stale/current |
| ... | ... |
| CSI report #n | Stale/current |

TABLE II

| CSI report #1 Part 1 | Stale/current |
| ... | ... |
| CSI report #n Part 1 | Stale/current |
| CSI report #1 Part 2 | Stale/current |
| ... | ... |
| CSI report #n Part 2 | Stale/current |

To further increase the transmission efficiency, not all parts of a stale CSI report need to be included in the uplink message 108. In addition, when there is a priority among multiple CSI reports, efficiency may be gained when only one stale CSI report is included in the uplink message 108.

In some examples, the uplink message 108 may include a first part of a stale CSI report that is generated based at least in part on the CSI measurements 121 performed during the current reference time period, and a second part of the stale CSI report that is generated based at least in part on the CSI measurements performed prior to the current reference time period. Alternatively, the uplink message 108 includes the first part of the stale CSI report that is generated based at least in part on the CSI measurement performed prior to the current reference time period, while the second part of the stale CSI report is not included in the uplink message 108.

Similarly, if the uplink message 108 includes a stale CSI report having part 2 group 0 being generated based at least in part on the CSI measurements performed prior to the current reference time period, the uplink message 108 may omit the CSI report part 2 groups 1 and 2.

In some examples, multiple CSI reports included in the uplink message 108 have a relative priority, and the stale CSI report has a least priority of the multiple CSI reports included in the uplink message 108. Hence, the uplink message 108 includes only one stale CSI report with the least priority. When there are multiple CSI reports, each CSI report may have a priority. When the UE 105 decides to skip CSI measurement and report a stale CSI report, the UE may select the CSI report with the lowest priority to be a stale CSI report. In this way, the base station 101 knows that the UE 105 does not randomly send stale CSI report that might be important for the network. In some examples, multiple CSI reports have a relative priority according to a priority sequence below: a CSI report including layer 1 reference signal received power (L1-RSRP) or a signal to interference plus noise ratio (SINR)>a CSI report including other reportQuantity, where reportQuantity is configured in RRC as part of CSI report configuration; and an aperiodic (AP) CSI report>a semi-persistent (SP) CSI report carried by physical uplink shared channel (PUSCH)>a semi-persistent (SP) CSI report carried by physical uplink control channel (PUCCH)>a periodic CSI report carried by PUCCH, where a symbol ">" means "having higher priority." The priority sequence above is merely as an example. Other kinds of priority sequence are possible for other examples.

In some examples, to complete CSI reporting to the base station 101, the uplink message 108 may be carried by a PUCCH or a PUSCH. Currently, the standard document, 3GPP TS 38.212 V16.2.0 (2020-06) (hereinafter referred to as TS 38.212), includes a technical specification for Multiplexing and channel coding of Radio Access Network. Various mapping of CSI reports and UCI bit sequences for PUCCH or PUSCH are provided in TS 38.212, including Table 6.3.1.1.2-12, Table 6.3.1.1.2-13, and Table 6.3.1.1.2-14, or Table 6.3.2.1.2-6 and Table 6.3.2.1.2-7. As shown below in the modified tables, when a stale CSI report is allowed, an additional column of bits shown in the column "Stale CSI" may be added to the Table 6.3.1.1.2-12, Table 6.3.1.1.2-13, Table 6.3.1.1.2-14, Table 6.3.2.1.2-6 and Table 6.3.2.1.2-7 of TS 38.212 to indicate whether the corresponding CSI report is stale or current. For example, a logic "0" can represent a corresponding CSI report is a stale CSI report, and a logic "1" can represent a corresponding CSI report is a current CSI report.

TABLE 6.3.1.1.2-12

Mapping order of CSI reports to UCI bit sequence
$a_0, a_1, a_2, a_3, \ldots, a_{A-1}$, without two-part CSI report(s)

| UCI bit sequence | CSI report number | Stale CSI |
|---|---|---|
| $a_0$ | CSI report #1 | 0/1 |
| $a_1$ | as in Table 6.3.1.1.2-7/8 | |
| $a_2$ | CSI report #2 | 0/1 |
| $a_3$ | as in Table 6.3.1.1.2-7/8 | |
| . | ... | 0/1 |
| . | CSI report #n | 0/1 |
| . | as in Table 6.3.1.1.2-7/8 | |
| $a_{A-1}$ | | |

TABLE 6.3.1.1.2-13

Mapping order of CSI reports to UCI bit sequence
$a_0^{(1)}, a_1^{(1)}, a_2^{(1)}, a_3^{(1)}, \ldots, a_{A^{(1)}-1}^{(1)}$, with two-part CSI report(s)

| UCI bit sequence | CSI report number | Stale CSI |
|---|---|---|
| $a_0^{(1)}$ | CSI report #1 if CSI report #1 is not of two parts, or CSI report #1, CSI part 1, if CSI report #1 is of two parts, as in Table 6.3.1.1.2-7/8/9 | 0/1 |
| $a_1^{(1)}$ | | |
| $a_2^{(1)}$ | | |
| $a_3^{(1)}$ | CSI report #2 if CSI report #2 is not of two parts, or CSI report #2, CSI part 1, if CSI report #2 is of two parts, as in Table 6.3.1.1.2-7/8/9 | 0/1 |
| . | | |
| . | ... | 0/1 |
| . | | |
| $a_{A^{(1)}-1}^{(1)}$ | CSI report #n if CSI report #n is not of two parts, or CSI report #n, CSI part 1, if CSI report #n is of two parts, as in Table 6.3.1.1.2-7/8/9 | 0/1 |

TABLE 6.3.1.1.2-14

Mapping order of CSI reports to UCI bit sequence
$a_0^{(2)}, a_1^{(2)}, a_2^{(2)}, a_3^{(2)}, \ldots, a_{A^{(2)}-1}^{(2)}$, with two-part CSI report(s)

| UCI bit sequence | CSI report number | Stale CSI |
|---|---|---|
| $a_0^{(2)}$ | CSI report #1, CSI part 2 wideband, as in Table 6.3.1.1.2-10 if CSI part 2 exists for CSI report #1 | 0/1 |
| $a_1^{(2)}$ | | |
| $a_2^{(2)}$ | CSI report #2, CSI part 2 wideband, as in Table 6.3.1.1.2-10 if CSI part 2 exists for CSI report #2 | 0/1 |
| $a_3^{(2)}$ | | |
| . | ... | 0/1 |
| . | CSI report #n, CSI part 2 wideband, as in Table 6.3.1.1.2-10 if CSI part 2 exists for CSI report #n | 0/1 |

TABLE 6.3.1.1.2-14-continued

Mapping order of CSI reports to UCI bit sequence
$a_0^{(2)}, a_1^{(2)}, a_2^{(2)}, a_3^{(2)}, \ldots, a_{A^{(2)}-1}^{(2)}$, with two-part CSI report(s)

| UCI bit sequence | CSI report number | Stale CSI |
|---|---|---|
| $a_{A^{(2)}-1}^{(2)}$ | CSI report #1, CSI part 2 subband, as in Table 6.3.1.1.2-11 if CSI part 2 exists for CSI report #1 | 0/1 |
| | CSI report #2, CSI part 2 subband, as in Table 6.3.1.1.2-11 if CSI part 2 exists for CSI report #2 | 0/1 |
| | ... | 0/1 |
| | CSI report #n, CSI part 2 subband, as in Table 6.3.1.1.2-11 if CSI part 2 exists for CSI report #n | 0/1 |

TABLE 6.3.2.1.2-6

Mapping order of CSI reports to UCI bit sequence
$a_0^{(1)}, a_1^{(1)}, a_2^{(1)}, a_3^{(1)}, \ldots, a_{A^{(1)}-1}^{(1)}$, with two-part CSI report(s)

| UCI bit sequence | CSI report number | Stale CSI |
|---|---|---|
| $a_0^{(1)}$ | CSI part 1 of CSI report #1 as in Table 6.3.2.1.2-3 | 0/1 |
| $a_1^{(1)}$ | CSI part 1 of CSI report #2 as in Table 6.3.2.1.2-3 | 0/1 |
| $a_2^{(1)}$ | ... | 0/1 |
| $a_3^{(1)}$ | CSI part 1 of CSI report #n as in Table 6.3.2.1.2-3 | 0/1 |
| . | | |
| . | | |
| . | | |
| $a_{A^{(1)}-1}^{(1)}$ | | |

TABLE 6.3.2.1.2-7

Mapping order of CSI reports to UCI bit sequence
$a_0^{(2)}, a_1^{(2)}, a_2^{(2)}, a_3^{(2)}, \ldots, a_{A^{(2)}-1}^{(2)}$, with two-part CSI report(s)

| UCI bit sequence | CSI report number | Stale CSI |
|---|---|---|
| $a_0^{(2)}$ | CSI report #1, CSI part 2 wideband, as in Table 6.3.2.1.2-4, or CSI part 2 with group 0, as in Table 6.3.2.1.2-5A, if CSI part 2 exists for CSI report #1 | 0/1 |
| $a_1^{(2)}$ | | |
| $a_2^{(2)}$ | | |
| $a_3^{(2)}$ | CSI report #2, CSI part 2 wideband, as in Table 6.3.2.1.2-4, or CSI part 2 with group 0, as in Table 6.3.2.1.2-5A, if CSI part 2 exists for CSI report #2 | 0/1 |
| . | | |
| . | ... | 0/1 |
| . | | |
| $a_{A^{(2)}-1}^{(2)}$ | CSI report #n, CSI part 2 wideband, as in Table 6.3.2.1.2-4, or CSI part 2 with group 0, as in Table 6.3.2.1.2-5A, if CSI part 2 exists for CSI report #n | 0/1 |
| | CSI report #1, CSI part 2 subband, as in Table 6.3.2.1.2-5, or CSI part 2 with group 1 and 2, as in Table 6.3.2.1.2-5A, if CSI part 2 exists for CSI report #1 | 0/1 |
| | CSI report #2, CSI part 2 subband, as in Table 6.3.2.1.2-5, or CSI part 2 with group 1 and 2, as in Table 6.3.2.1.2-5A, if CSI part 2 exists for CSI report #2 | 0/1 |
| | ... | 0/1 |
| | CSI report #n, CSI part 2 subband, as in Table 6.3.2.1.2-5, or CSI part 2 with group 1 and 2, as in Table 6.3.2.1.2-5A, if CSI part 2 exists for CSI report #n | 0/1 |

Figure 4:
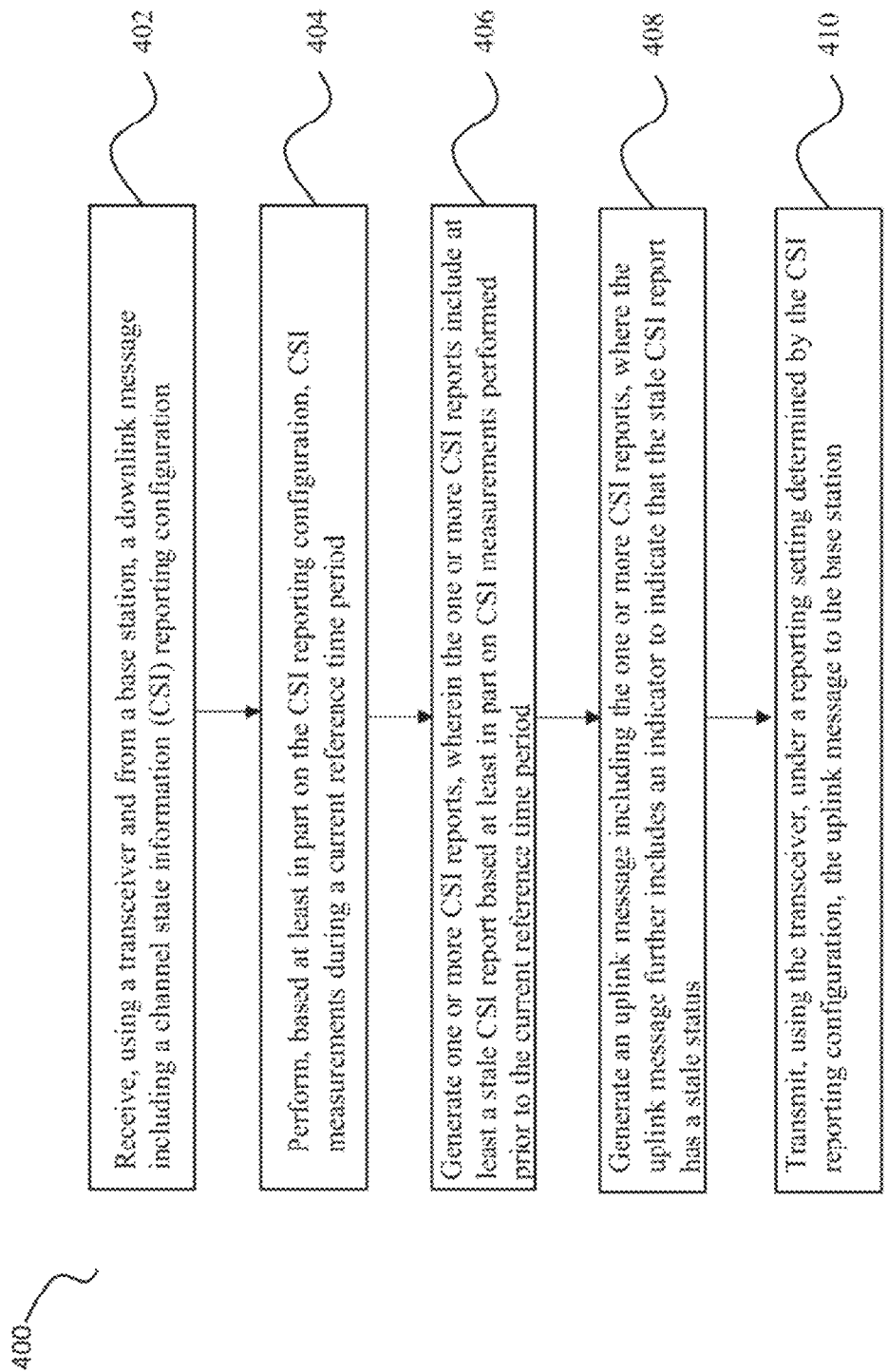
FIG. 4 illustrates an example method for a system (for example a user equipment (UE)) supporting mechanisms for implementing designs for CSI reporting that includes a stale CSI report, according to some aspects of the disclosure.

FIG. 4 illustrates an example method 400 for a system (for example a UE) supporting mechanisms for implementing designs for CSI reporting that includes a stale CSI report, according to some aspects of the disclosure. As a convenience and not a limitation, FIG. 4 may be described with regard to elements of FIGS. 1, 6, and 7. Method 400 may represent the operation of an electronic device (for example, UE 105 of FIG. 1) implementing mechanisms for implementing CSI reporting that includes a stale CSI report. Method 400 may also be performed by system 600 of FIG. 6 and/or computer system 700 of FIG. 7. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

At 402, using a transceiver, a UE receives a downlink message from a base station, the downlink message including a CSI reporting configuration. For example, using a transceiver, the UE 105 receives the downlink message 102 including the CSI reporting configuration 104 from the base station 101, as described for FIG. 1.

At 404, based at least in part on the CSI reporting configuration, a UE performs CSI measurements during a current reference time period. For example, based at least in part on the CSI reporting configuration 104, the UE 105 performs CSI measurements during a current reference time period to obtain the CSI measurements 121, as described for FIG. 1. For example, the CSI measurements includes a measurement for a parameter selected from a CSI reference signal (CSI-RS) resource indicator (CRI), a synchronization signal/physical broadcast channel (PBCH) block resource indicator (SSBRI), a layer 1 reference signal received power (L1-RSRP), a rank indicator (RI), a precoding matrix indicator (PMI), a layer indicator (LI), a channel quality indicator (CQI), or a signal to interference plus noise ratio (SINR).

At 406, a UE generates one or more CSI reports, where the one or more CSI reports include at least a stale CSI report based at least in part on CSI measurements performed prior to the current reference time period. For example, the UE 105 generates one or more CSI reports, e.g., the CSI report 111 and/or the CSI report 113. The CSI report 111 is a stale CSI report based at least in part on CSI measurements performed prior to the current reference time period, as described for FIG. 1.

At 408, a UE generates an uplink message including the one or more CSI reports, where the uplink message further includes an indicator to indicate that the stale CSI report has a stale status. For example, the UE 105 generates the uplink message 108 including the one or more CSI reports, e.g., the stale CSI report 111, and the current CSI report 113, as described for FIG. 1. Furthermore, the uplink message 108 includes the indicator 112 to indicate that the stale CSI report 111 has a stale status, and the indicator 114 to indicate that the current CSI report 113 has a current status.

At 410, using the transceiver, under a reporting setting determined by the CSI reporting configuration, a UE transmits the uplink message to the base station. For example, using the transceiver, under the reporting setting 106 determined by the CSI reporting configuration 104, the UE 105 transmits the uplink message 108 to the base station 105, as described for FIG. 1.

Figure 5:
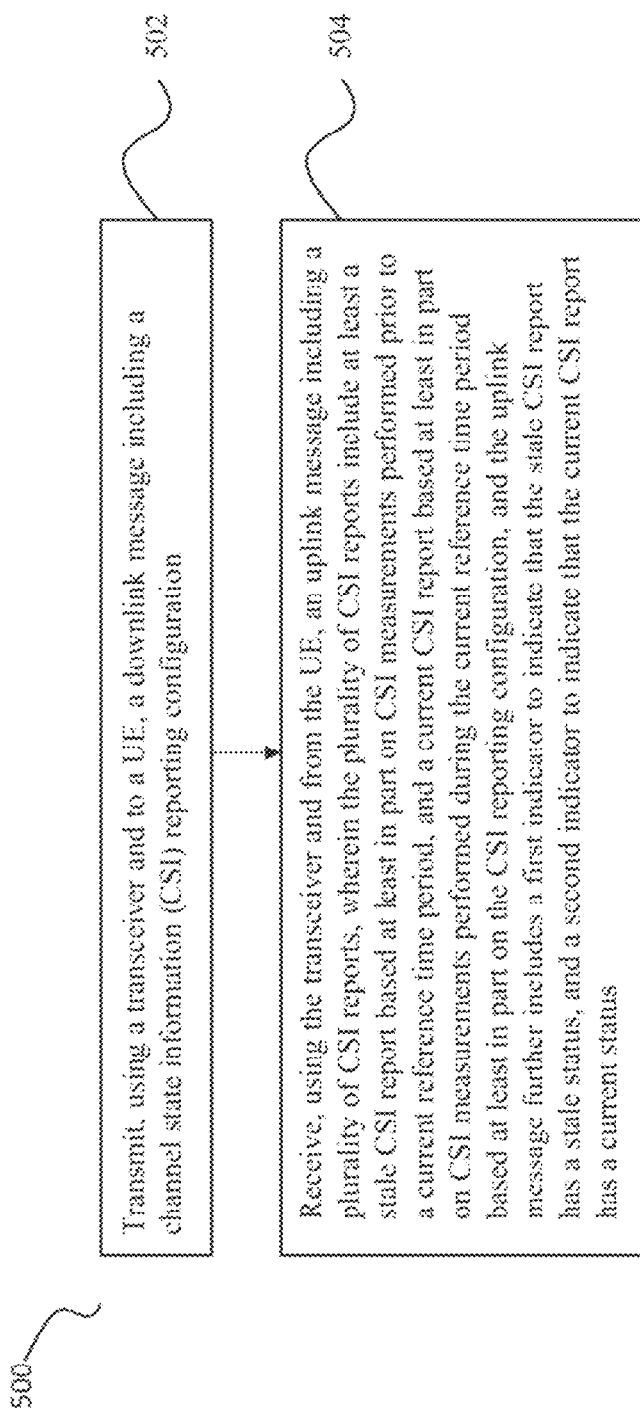
FIG. 5 illustrates an example method for a system (for example a base station) supporting mechanisms for implementing designs for CSI reporting that includes a stale CSI report, according to some aspects of the disclosure.

FIG. 5 illustrates an example method 500 for a system (for example a base station) supporting mechanisms for implementing designs for CSI reporting that includes a stale CSI report, according to some aspects of the disclosure. As a convenience and not a limitation, FIG. 5 may be described with regard to elements of FIGS. 1, 6, and 7. Method 500 may represent the operation of an electronic device (for example, base station 101 of FIG. 1) implementing mechanisms for implementing CSI reporting that includes a stale CSI report. Method 500 may also be performed by system 600 of FIG. 6 and/or computer system 700 of FIG. 7. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5.

At 502, a base station transmits, using a transceiver, a downlink message including a CSI reporting configuration to a UE. For example, the base station 101 transmits, using a transceiver, the downlink message 102 including the CSI reporting configuration 104 to the UE 105, as described for FIG. 1.

At 504, a base station receives, using the transceiver, an uplink message including a plurality of CSI reports from the UE. The plurality of CSI reports include at least a stale CSI report based at least in part on CSI measurements performed prior to a current reference time period, and a current CSI report based at least in part on CSI measurements performed during the current reference time period based at least in part on the CSI reporting configuration. The uplink message can further includes a first indicator to indicate that the stale CSI report has a stale status, and a second indicator to indicate that the current CSI report has a current status. For example, the base station 101 receives from the UE 105 the uplink message 108 including a plurality of CSI reports, e.g., the stale CSI report 111 and the current CSI report 113, as described for FIG. 1. Furthermore, the uplink message 108 includes the indicator 112 to indicate that the stale CSI report 111 has a stale status, and the indicator 114 to indicate that the current CSI report 113 has a current status.

FIG. 6 illustrates a block diagram of an example system 600 of an electronic device implementing designs for CSI reporting that includes a stale CSI report, according to some aspects of the disclosure. System 600 may be any of the electronic devices (e.g., the base station 101, the UE 105) of system 100. The system 600 includes a processor 610, one or more transceivers 620, communication infrastructure 640, memory 650, operating system 652, application 654, and one or more antenna 660. Illustrated systems are provided as exemplary parts of system 600, and system 600 can include other circuit(s) and subsystem(s). Also, although the systems of system 600 are illustrated as separate components, the aspects of this disclosure can include any combination of these, less, or more components.

Memory 650 may include random access memory (RAM) and/or cache, and may include control logic (e.g., computer software) and/or data. Memory 650 may include other storage devices or memory such as, but not limited to, a hard disk drive and/or a removable storage device/unit. According to some examples, operating system 652 can be stored in memory 650. Operating system 652 can manage transfer of data from memory 650 and/or one or more applications 654 to processor 610 and/or one or more transceivers 620. In some examples, operating system 652 maintains one or more network protocol stacks (e.g., Internet protocol stack, cellular protocol stack, and the like) that can include a number of logical layers. At corresponding layers of the protocol stack, operating system 652 includes control mechanism and data structures to perform the functions associated with that layer.

According to some examples, application 654 can be stored in memory 650. Application 654 can include applications (e.g., user applications) used by wireless system 600 and/or a user of wireless system 600. The applications in application 654 can include applications such as, but not limited to, Siri™, FaceTime™, radio streaming, video streaming, remote control, and/or other user applications.

System 600 can also include communication infrastructure 640. Communication infrastructure 640 provides communication between, for example, processor 610, one or more transceivers 620, and memory 650. In some implementations, communication infrastructure 640 may be a bus. Processor 610 together with instructions stored in memory 650 performs operations enabling system 600 to implement mechanisms for CSI reporting that includes a stale CSI report, as described herein for the system 100 as shown in FIG. 1.

One or more transceivers 620 transmit and receive communications signals that support mechanisms for CSI reporting that includes a stale CSI report. Additionally, one or more transceivers 620 transmit and receive communications signals that support mechanisms for measuring communication link(s), and generating and transmitting CSI reports. According to some aspects, one or more transceivers 620 may be coupled to antenna 660. Antenna 660 may include one or more antennas that may be the same or different types. One or more transceivers 620 allow system 600 to communicate with other devices that may be wired and/or wireless. In some examples, one or more transceivers 620 can include processors, controllers, radios, sockets, plugs, buffers, and like circuits/devices used for connecting to and communication on networks. According to some examples, one or more transceivers 620 include one or more circuits to connect to and communicate on wired and/or wireless networks.

According to some aspects of this disclosure, one or more transceivers 620 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 620 can include more or fewer systems for communicating with other devices.

In some examples, one or more transceivers 620 can include one or more circuits (including a WLAN transceiver) to enable connection(s) and communication over WLAN networks such as, but not limited to, networks based on standards described in IEEE 802.11.

Additionally, or alternatively, one or more transceivers 620 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, one or more transceivers transceiver 620 can include a Bluetooth™ transceiver.

Additionally, one or more transceivers 620 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220 can be configured to operate according to one or more of Rel-15, Rel-16, Rel-17, or later of 3GPP standard.

According to some aspects of this disclosure, processor 610, alone or in combination with computer instructions stored within memory 650, and/or one or more transceiver 620, implements the methods and mechanisms discussed in this disclosure. For example, processor 610, alone or in combination with computer instructions stored within memory 650, and/or one or more transceiver 220, implements mechanisms for CSI reporting that includes a stale CSI report. According to some aspects of this disclosure, processor 610, alone or in combination with computer instructions stored within memory 650, and/or one or more transceiver 620, can receive from a base station (for example base station 101 of FIG. 1) the CSI reporting configuration message 104. Using the received CSI reporting configuration message 104, processor 610 can perform CSI measurements via the transceiver 620 during a current reference time period based at least in part on the CSI reporting configuration 104, and generate one or more CSI reports including at least a stale CSI report, e.g., the stale CSI report 111. In addition, processor 610 can generate the uplink message 108 including the one or more CSI reports, and transmit, using the transceiver 620, under the reporting setting 106 determined by the CSI reporting configuration 104, the uplink message 108 to the base station 101.

Various aspects can be implemented, for example, using one or more computer systems, such as computer system 700 shown in FIG. 7. Computer system 700 can be any well-known computer capable of performing the functions described herein such as devices 101, 105 of FIG. 1, or 600 of FIG. 6. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 708, the removable storage unit 718, the removable storage unit 722 can store instructions that, when executed by processor 704, cause processor 704 to perform operations for a UE, e.g., the UE 105, or a base station, e.g., the base station 101. In some examples, the operations include receiving a downlink message including a CSI reporting configuration from a base station, performing CSI measurements during a current reference time period based at least in part on the CSI reporting configuration, generating a plurality of CSI reports including at least a stale CSI report based at least in part on CSI measurements performed prior to the current reference time period, generating an uplink message including the plurality of CSI reports, and transmitting the uplink message to the base station under a reporting setting determined by the CSI reporting configuration.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments or examples, at least one of the components set forth in one or more of the preceding figures may be configured to perform one or more operations, techniques, processes, and/or methods as set forth in the example section below. For example, circuitry associated with a UE, base station, network element, etc. as described above in connection with one or more of the preceding figures may be configured to operate in accordance with one or more of the examples set forth below in the example section.

EXAMPLES

Example 1 includes a user equipment (UE), comprising: a transceiver configured to wirelessly communicate with a base station; and a processor communicatively coupled to the transceiver and configured to: receive, using the transceiver and from the base station, a downlink message including a channel state information (CSI) reporting configuration; perform, based at least in part on the CSI reporting configuration, CSI measurements during a current reference time period; generate one or more CSI reports, wherein the one or more CSI reports include at least a stale CSI report based at least in part on CSI measurements performed prior to the current reference time period; generate an uplink message including the one or more CSI reports; and transmit, using the transceiver, under a reporting setting determined by the CSI reporting configuration, the uplink message to the base station.

Example 2 includes the UE of example 1 and/or some other example herein, wherein the uplink message further includes an indicator to indicate that the stale CSI report has a stale status.

Example 3 includes the UE of example 2 and/or some other example herein, wherein the indicator is a first indicator, and wherein the one or more CSI reports further include a current CSI report generated based at least in part on the CSI measurements performed during the current reference time period, and wherein the uplink message further includes a second indicator to indicate that the current CSI report has a current status.

Example 4 includes the UE of example 3 and/or some other example herein, wherein the uplink message includes a CSI reporting table including the stale CSI report, the first indicator, the current CSI report, and the second indicator.

Example 5 includes the UE of example 1 and/or some other example herein, wherein the uplink message is carried by a physical uplink control channel (PUCCH) or a physical uplink shared channel (PUSCH).

Example 6 includes the UE of example 1 and/or some other example herein, wherein the CSI measurements performed during the current reference time period include a measurement for a parameter selected from a CSI reference signal (CSI-RS) resource indicator (CRI), a synchronization signal/physical broadcast channel (PBCH) block resource indicator (SSBRI), a layer 1 reference signal received power (LI-RSRP), a rank indicator (RI), a precoding matrix indicator (PMI), a layer indicator (LI), a channel quality indicator (CQI), or a signal to interference plus noise ratio (SINR).

Example 7 includes the UE of example 1 and/or some other example herein, wherein the CSI measurements performed during the current reference time period include a measurement collected for each signal path of multiple signal paths between multiple antenna ports at the base station and the UE.

Example 8 includes the UE of example 1 and/or some other example herein, wherein the one or more CSI reports included in the uplink message have a relative priority, and the stale CSI report has a least priority of the one or more CSI reports.

Example 9 includes the UE of example 1 and/or some other example herein, wherein the uplink message includes a first part of the stale CSI report that is generated based at least in part on the CSI measurements performed during the current reference time period, and a second part of the stale CSI report that is generated based at least in part on the CSI measurements performed prior to the current reference time period, wherein the stale CSI report includes the first part and the second part; or wherein the uplink message includes the first part of the stale CSI report that is generated based at least in part on the CSI measurements performed prior to the current reference time period, while the second part of the stale CSI report is not included in the uplink message.

Example 10 includes the UE of example 1 and/or some other example herein, wherein the reporting setting includes an aperiodic setting, a periodic setting, or a semi-persistent setting.

Example 11 includes the UE of example 1 and/or some other example herein, wherein the reporting setting includes a semi-persistent setting or an aperiodic setting, which is activated by a downlink control information (DCI), and wherein the DCI further activates a semi-persistent CSI reference signal to perform the CSI measurements in semi-persistent or aperiodic manner.

Example 12 includes the UE of example 11 and/or some other example herein, wherein the semi-persistent CSI reference signal is activated after a predetermined time period from when the DCI is received.

Example 13 includes a method for a user equipment (UE), comprising: receiving, by the UE and from a base station, a downlink message including a channel state information (CSI) reporting configuration; generating a plurality of CSI reports, wherein the plurality of CSI reports include at least a stale CSI report based at least in part on CSI measurements performed prior to a current reference time period, and a current CSI report based at least in part on CSI measurements performed during the current reference time period and based at least in part on the CSI reporting configuration; generating an uplink message including the plurality of CSI reports; and transmitting, under a reporting setting determined by the CSI reporting configuration, the uplink message to the base station.

Example 14 includes the method of example 13 and/or some other example herein, wherein the uplink message further includes a first indicator to indicate that the stale CSI report has a stale status, and a second indicator to indicate that the current CSI report has a current status.

Example 15 includes the method of example 14 and/or some other example herein, wherein the uplink message includes a CSI reporting table including the stale CSI report, the first indicator, the current CSI report, and the second indicator.

Example 16 includes the method of example 13 and/or some other example herein, wherein the plurality of CSI reports included in the uplink message have a relative priority, and the stale CSI report has a least priority among the plurality of CSI reports.

Example 17 includes a non-transitory computer-readable medium storing instructions that, when executed by a processor of a user equipment (UE), cause the UE to perform operations, the operations comprising: receiving from a base station, a downlink message including a channel state information (CSI) reporting configuration; performing, based at least in part on the CSI reporting configuration, CSI measurements during a current reference time period; generating a plurality of CSI reports, wherein the plurality of CSI reports include at least a stale CSI report based at least in part on CSI measurements performed prior to the current reference time period, and a current CSI report based at least in part on the CSI measurements performed during the current reference time period; generating an uplink message including the plurality of CSI reports; and transmitting, under a reporting setting determined by the CSI reporting configuration, the uplink message to the base station.

Example 18 includes the non-transitory computer-readable medium of example 17 and/or some other example herein, wherein the plurality of CSI reports included in the uplink message have a relative priority according to a priority sequence below: a CSI report including layer 1 reference signal received power (LI-RSRP) or a signal to interference plus noise ratio (SINR)>a CSI report including other reportQuantity, where reportQuantity is configured in RRC as part of CSI report configuration; and an aperiodic (AP) CSI report>a semi-persistent (SP) CSI report carried by physical uplink shared channel (PUSCH)>a semi-persistent (SP) CSI report carried by physical uplink control channel (PUCCH)>a periodic CSI report carried by PUCCH; wherein a symbol ">" means "having higher priority".

Example 19 includes the non-transitory computer-readable medium of example 17 and/or some other example herein, wherein the stale CSI report includes a first part and a second part, where the second part includes multiple groups, and wherein the first part, or a group of the multiple groups of the second part is generated based at least in part on the CSI measurements performed prior to the current reference time period.

Example 20 includes the non-transitory computer-readable medium of example 17 and/or some other example herein, wherein the uplink message further includes a first indicator represented by one or more bits to indicate that the stale CSI report has a stale status, and a second indicator represented by one or more bits to indicate that the current CSI report has a current status.

Example 21 includes a base station, comprising: a transceiver configured to communicate with a user equipment (UE); and a processor communicatively coupled to the transceiver and configured to: transmit, using the transceiver and to the UE, a downlink message including a channel state information (CSI) reporting configuration; and receive, using the transceiver and from the UE, an uplink message including a plurality of CSI reports, wherein the plurality of CSI reports include at least a stale CSI report based at least in part on CSI measurements performed prior to a current reference time period, and a current CSI report based at least in part on CSI measurements performed during the current reference time period based at least in part on the CSI reporting configuration.

Example 22 includes the base station of example 21 and/or some other example herein, wherein the uplink message further includes a first indicator to indicate that the stale CSI report has a stale status, and a second indicator to indicate that the current CSI report has a current status.

Example 23 includes the base station of example 21 and/or some other example herein, wherein the CSI measurements performed during the current reference time period include a measurement for a parameter selected from a CSI reference signal (CSI-RS) resource indicator (CRI), a synchronization signal/physical broadcast channel (PBCH) block resource indicator (SSBRI), a layer 1 reference signal received power (L1-RSRP), a rank indicator (RI), a precoding matrix indicator (PMI), a layer indicator (LI), a channel quality indicator (CQI), or a signal to interference plus noise ratio (SINR).

What is claimed is:

1. A user equipment (UE), comprising:
   a transceiver configured to wirelessly communicate with a base station; and
   a processor communicatively coupled to the transceiver and configured to:
   receive, using the transceiver and from the base station, a downlink message including a channel state information (CSI) reporting configuration;
   perform, based at least in part on the CSI reporting configuration, CSI measurements during a current reference time period;
   generate one or more CSI reports, wherein a CSI report of the one or more CSI reports includes at least a first part and a second part, the first part being a Type I standard-resolution report and the second part being a Type II high resolution report, the first part generated based at least in part on the CSI measurements performed during the current reference time period, and the second part including at least a stale CSI report generated based at least in part on CSI measurements performed prior to the current reference time period;
   generate an uplink message including the one or more CSI reports; and
   transmit, using the transceiver, under a reporting setting determined by the CSI reporting configuration, the uplink message to the base station.

2. The UE of claim 1, wherein the uplink message further includes an indicator to indicate that the stale CSI report has a stale status.

3. The UE of claim 2, wherein the indicator is a first indicator, and wherein the one or more CSI reports further include a current CSI report generated based at least in part on the CSI measurements performed during the current reference time period, and wherein the uplink message further includes a second indicator to indicate that the current CSI report has a current status.

4. The UE of claim 3, wherein the uplink message includes a CSI reporting table including the stale CSI report, the first indicator, the current CSI report, and the second indicator.

5. The UE of claim 1, wherein the uplink message is carried by a physical uplink control channel (PUCCH) or a physical uplink shared channel (PUSCH).

6. The UE of claim 1, wherein the CSI measurements performed during the current reference time period include a measurement for a parameter selected from a CSI reference signal (CSI-RS) resource indicator (CRI), a synchronization signal/physical broadcast channel (PBCH) block resource indicator (SSBRI), a layer 1 reference signal received power (L1-RSRP), a rank indicator (RI), a precoding matrix indicator (PMI), a layer indicator (LI), a channel quality indicator (CQI), or a signal to interference plus noise ratio (SINR).

7. The UE of claim 1, wherein the CSI measurements performed during the current reference time period include a measurement collected for each signal path of multiple signal paths between multiple antenna ports at the base station and the UE.

8. The UE of claim 1, wherein the one or more CSI reports included in the uplink message have a relative priority, and the stale CSI report has a least priority of the one or more CSI reports.

9. The UE of claim 1, wherein the reporting setting includes an aperiodic setting, a periodic setting, or a semi-persistent setting.

10. The UE of claim 1, wherein the reporting setting includes a semi-persistent setting or an aperiodic setting, which is activated by a downlink control information (DCI), and wherein the DCI further activates a semi-persistent CSI reference signal to perform the CSI measurements in a semi-persistent or aperiodic manner.

11. The UE of claim 10, wherein the semi-persistent CSI reference signal is activated after a predetermined time period from when the DCI is received.

12. A method for a user equipment (UE), comprising:
   receiving, by the UE and from a base station, a downlink message including a channel state information (CSI) reporting configuration;
   generating a plurality of CSI reports, wherein a CSI report of the plurality of CSI reports includes at least a first part and a second part, the first part being a Type I standard-resolution report and the second part being a Type II high resolution report, the first part generated based at least in part on CSI measurements performed during a current reference time period, and the second part including at least a stale CSI report generated based at least in part on CSI measurements performed prior to the current reference time period;

generating an uplink message including the plurality of CSI reports; and transmitting, under a reporting setting determined by the CSI reporting configuration, the uplink message to the base station.

13. The method of claim 12, wherein the uplink message further includes a first indicator to indicate that the stale CSI report has a stale status, and a second indicator to indicate that the current CSI report has a current status.

14. The method of claim 13, wherein the uplink message includes a CSI reporting table including the stale CSI report, the first indicator, the current CSI report, and the second indicator.

15. The method of claim 12, wherein the plurality of CSI reports included in the uplink message have a relative priority, and the stale CSI report has a least priority among the plurality of CSI reports.

16. A non-transitory computer-readable medium storing instructions that, when executed by a processor of a user equipment (UE), cause the UE to perform operations, the operations comprising:

receiving from a base station, a downlink message including a channel state information (CSI) reporting configuration;

performing, based at least in part on the CSI reporting configuration, CSI measurements during a current reference time period;

generating a plurality of CSI reports, wherein a CSI report of the plurality of CSI reports includes at least a first part and a second part, the first part being a Type I standard-resolution report and the second part being a Type II high resolution report, the first part generated based at least in part on the CSI measurements performed during the current reference time period, and the second part including at least a stale CSI report generated based at least in part on CSI measurements performed prior to the current reference time period;

generating an uplink message including the plurality of CSI reports; and transmitting, under a reporting setting determined by the CSI reporting configuration, the uplink message to the base station.

17. The non-transitory computer-readable medium of claim 16, wherein the plurality of CSI reports included in the uplink message have a relative priority according to a priority sequence below:

a CSI report including layer 1 reference signal received power (L1-RSRP) or a signal to interference plus noise ratio (SINR)>a CSI report including other reportQuantity, where reportQuantity is configured in Radio Resource Control (RRC) as a part of CSI report configuration; and an aperiodic (AP) CSI report> a semi-persistent (SP) CSI report carried by physical uplink shared channel (PUSCH)> a semi-persistent (SP) CSI report carried by physical uplink control channel (PUCCH)> a periodic CSI report carried by PUCCH;

wherein a symbol ">" means "having higher priority".

18. The non-transitory computer-readable medium of claim 16, wherein the stale CSI report includes a first part and a second part, where the second part includes multiple groups, and wherein the first part, or a group of the multiple groups of the second part is generated based at least in part on the CSI measurements performed prior to the current reference time period.

19. The non-transitory computer-readable medium of claim 16, wherein the uplink message further includes a first indicator represented by one or more bits to indicate that the stale CSI report has a stale status, and a second indicator represented by one or more bits to indicate that the current CSI report has a current status.

* * * * *